United States Patent [19]

Lorette et al.

[11] 4,344,916
[45] Aug. 17, 1982

[54] METHOD FOR SHIPPING AND STORING ETHYLENE OXIDE

[75] Inventors: Nicholas B. Lorette, Lake Jackson, Tex.; Jerry L. Fosnaugh, Carmel, Ind.

[73] Assignee: The Dow Chemical Company, Midland, Mich.

[21] Appl. No.: 240,746

[22] Filed: Mar. 5, 1981

Related U.S. Application Data

[63] Continuation of Ser. No. 141,236, Apr. 17, 1980, abandoned.

[51] Int. Cl.$^3$ ............... B01J 19/00; A01N 31/00; C07D 301/36; C07D 303/00
[52] U.S. Cl. .................................... 422/40; 252/407; 422/34; 424/278
[58] Field of Search ............... 422/40, 34; 252/407; 424/278

[56] References Cited

U.S. PATENT DOCUMENTS 3,238,096  3/1966  Kaye .................................. 422/34 X

FOREIGN PATENT DOCUMENTS 818663  8/1959  United Kingdom ................. 422/34

OTHER PUBLICATIONS

"Ethylene Oxide–Hazards and Methods of Handling", I & EC, vol. 42, No. 6, Jun. 1950, pp. 1251–1258.

*Primary Examiner*—Barry S. Richman
*Attorney, Agent, or Firm*—A. C. Ancona

[57] ABSTRACT

A method of shipping liquid ethylene oxide in a manner which reduces the explosive hazard during shipment by combining the liquid ethylene oxide with at least 52% of liquid propylene oxide based on the total weight of the mixture. It is especially useful for bulk liquid shipment marine vessels and the ethylene oxide is easily separated from the mixture for use by a simple distillation.

4 Claims, No Drawings

METHOD FOR SHIPPING AND STORING ETHYLENE OXIDE

CROSS-REFERENCE TO RELATED APPLICATION

This is a continuation of our copending application Ser. No. 141,236 filed Apr. 17, 1980, now abandoned.

BACKGROUND OF THE INVENTION

Ethylene oxide (EO) is a useful reactive compound employed as a starting material in the manufacture of glycols, polyglycols, ethanolamines and polyethanolamines. It is highly flammable even in the absence of oxygen since it can undergo auto-oxidation under the appropriate temperature conditions or spark initiation.

Presently, it is the approved practice to ship EO with a nitrogen pad so that the vapor above it contains not less than 45% nitrogen. In the case of bulk marine shipment, there are additional requirements including cooling facilities to maintain the temperature below 90° F. (32.2° C.), tank construction with respect to pressure and materials and other numerous regulations (see Fed. Reg. Vol. 35, No. 38, Feb. 25, 1970). Because of these regulations the number of ships available is limited, at present there being only two such which are approved by the U.S. Coast Guard for carrying EO.

It would be most advantageous if a method of shipping could be found which would eliminate the need for shipping EO under the above indicated stringent requirements.

One possible solution to the problem of shipping EO would be to convert it to ethylene carbonate and then regenerate at the use-site. This solution is not attractive because the carbonate is 50% $CO_2$ by weight and the cost of shipping a product half of which is to be discarded would be too great.

It has now been discovered that safe shipment of EO can be accomplished by providing mixtures of EO with propylene oxide (PO) wherein the liquid mixture is of a composition such that the vapor composition contains at least 30% by weight PO. Such mixtures are not flammable in the absence of oxygen, i.e. they will not auto-oxidize. Liquid mixtures of EO and PO which contain up to 48% EO will provide such a non-flammable vapor.

SUMMARY OF THE INVENTION

The present invention is a method of transporting from a place of manufacture to a place of use, a normally flammable product, ethylene oxide, in a manner which minimizes the hazardous characteristics of the vapor, which has the capability of auto-oxidizing, which comprises mixing the ethylene oxide with propylene oxide to form a liquid mixture containing at least 52% by weight propylene oxide. The vapors in a confined space above such a mixture will contain a minimum of 30% by weight propylene oxide and such vapor compositions are not flammable in the absence of oxygen. The above liquid mixtures can be shipped to remote locations for use and then ethylene oxide can be separated, e.g. by distillation, for use as a reactant to make other products. Certain mixtures of EO-PO can be employed in the manufacture of polyethers for use in making polyurethanes.

DETAILED DESCRIPTION OF THE INVENTION

The properties of the mixtures of EO and PO together with properties of each of these compounds separately are shown with respect to those which relate to shipping or transporting them. Both EO and PO have physical properties that require special consideration in their storage, transportation, and handling. The properties that contribute to their hazardous character are listed in Table I.

TABLE I

| Physical Properties of Ethylene Oxide and Propylene Oxide | | |
|---|---|---|
| Property | EO | PO |
| Flash Point, °C. | <−18° | <−29° |
| Flammability Limits in Air, Vol. % | 3–100 | 2.2–39 |

The flash points of EO and PO are very low. If there is a spill of either and there is an ignition source, a fire will occur.

The dominant part of the problem is in the upper flammability limit of EO. It will "burn" at 100% EO vapor concentration. Because of this physical property, EO vapor can be "ignited" in the absence of oxygen by an ignition source such as a very hot vessel wall or by a flame "suck back" into the vessel.

Various mixtures of EO and PO vapor (no air) were subjected to a nichrome wire ignition source in a one liter cylinder at 75 psig pressure and 100° C. In these experiments, the pressure rapidly increased as much as 825 pounds (for pure EO) when ignition occurred. When the vapor contained at least 30% by weight of PO, no reaction occurred when the wire was activated. This is the composition of vapor produced by a liquid EO/PO mixture containing at least 52 wt. % PO.

TABLE II

| Wt % EO Vapor | Pressure Increase After Ignition Attempt (psig) |
|---|---|
| 0 (all PO) | None |
| 20 | " |
| 40 | " |
| 70 | " |
| 75 | 625 |
| 90 | 825 |
| 100 | 825 |

Note, in the above table the critical point for vapor composition occurs above 70%. Thus at 75 percent EO in the vapor mixture, a pressure increase occurs.

Additional data were obtained on a vapor composition of 30% wt of EO, 70% PO to determine the effects of higher temperatures and pressures. A hot wire ignition source was used in a one liter cylinder. Results are shown in Table III below.

TABLE III

| Flammability of a 30% Wt. EO-70% PO Gas Mixture at Increased Temperature and Pressure | | |
|---|---|---|
| Initial Press psig | Cylinder temp °C. | Pressure Increase After Ignition* |
| 75 | 190 | None |
| 75 | 215 | None |
| 75 | 240 | 30 psig |
| 220 | 155 | None |

TABLE III-continued

| Flammability of a 30% Wt. EO-70% PO Gas Mixture at Increased Temperature and Pressure | | |
|---|---|---|
| Initial Press psig | Cylinder temp °C. | Pressure Increase After Ignition* |
| 200 | 230 | 30 psig |

This shows reduced hazard when compared to the results shown in Table II when greater than 70% EO is present in the mixture.

The present invention is especially useful in shipment of ethylene oxide by marine bulk liquid shipping vessels.

We claim:

1. A method for transporting liquid ethylene oxide from a place of origin to a remote destination which comprises (1) mixing said ethylene oxide with at least 52% by weight of liquid propylene oxide based on the weight of the total mixture, (2) loading said liquid mixture into a container suitable for transport and (3) transporting said container by suitable means to said remote destination.

2. The method of claim 1 wherein the means for transport is a marine bulk liquid shipment vessel.

3. The method of claim 1 wherein the ethylene oxide is separated from the mixture at its destination by suitable separation means.

4. The method of claim 3 wherein said suitable separation means is a distillation means.

* * * * *